(12) United States Patent
Jain et al.

(10) Patent No.: US 12,198,100 B2
(45) Date of Patent: Jan. 14, 2025

(54) SYSTEMS AND METHODS FOR GENERATING A PICK-WALK

(71) Applicant: Walmart Apollo, LLC, Bentonville, AR (US)

(72) Inventors: Sakshi Jain, Kanpur (IN); Priyank Vashist, Bengaluru (IN); Abhin Hattikudru, Bangalore (IN); Ankur Kapoor, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 121 days.

(21) Appl. No.: 17/892,478

(22) Filed: Aug. 22, 2022

(65) Prior Publication Data

US 2023/0084550 A1 Mar. 16, 2023

Related U.S. Application Data

(60) Provisional application No. 63/244,652, filed on Sep. 15, 2021.

(51) Int. Cl.
*G06Q 10/0875* (2023.01)
*G06Q 10/047* (2023.01)

(52) U.S. Cl.
CPC ....... *G06Q 10/0875* (2013.01); *G06Q 10/047* (2013.01)

(58) Field of Classification Search
CPC .......... G06Q 10/0875; G06Q 10/047
See application file for complete search history.

(56) References Cited

U.S. PATENT DOCUMENTS

| 10,783,462 | B1* | 9/2020 | Mo ............... G06Q 10/047 |
| 2019/0325377 | A1 | 10/2019 | Rajkhowa et al. |
| 2020/0118061 | A1 | 4/2020 | Jain et al. |
| 2020/0387154 | A1* | 12/2020 | Sellner ............. G05D 1/0027 |
| 2021/0032035 | A1 | 2/2021 | Valinsky et al. |
| 2021/0110334 | A1 | 4/2021 | Singh et al. |
| 2021/0269244 | A1 | 9/2021 | Ahmann |

* cited by examiner

*Primary Examiner* — A. Hunter Wilder
(74) *Attorney, Agent, or Firm* — BRYAN CAVE LEIGHTON PAISNER LLP

(57) ABSTRACT

A system comprising one or more processors and one or more non-transitory computer-readable media storing computing instructions that, when executed on the one or more processors, cause the one or more processors to perform: receiving requests for at least two pick-walks to fulfill multiple orders; mapping each of the multiple items to respective aisles within at least a single portion of the location; calculating, using core logic, a minimum distance for each one of two or more pick-walks to fulfill the multiple orders, wherein the two or more pick-walks are revised through multiple iterations; generating the at least two pick-walks based on the two or more pick-walks; and transmitting the at least two pick-walks to the at least two pickers. Other embodiments are disclosed.

20 Claims, 9 Drawing Sheets

600

665 – Generating the at least two pick-walks

670 – Transmitting the at least two pick-walks to the at least two pickers

FIG. 6B

SYSTEMS AND METHODS FOR GENERATING A PICK-WALK

CROSS-REFERENCE TO RELATED APPLICATIONS

This application is a continuation of U.S. Application No. 63/244,652, filed Sep. 15, 2021. U.S. Application No. 63/244,652 is incorporated herein by reference in its entirety.

TECHNICAL FIELD

This disclosure relates generally relates to generating a pick walk.

BACKGROUND

Stores often stack millions of items in a facility based on a layout of the facility for employees to use to fulfill millions of orders received from users. Each order of the millions of orders can include a respective delivery date or a respective pick-up time of day requested by the respective user. Based on the orders, a respective pick-walk is generated for each employee to retrieve items associated with multiple orders at a time. Each pick walk can cover an area spanning a distance of over a thousand feet, which can be time consuming and inefficient to pick an order with a looming pick-up time or delivery date.

BRIEF DESCRIPTION OF THE DRAWINGS

To facilitate further description of the embodiments, the following drawings are provided in which:

FIGS. 6A and 6B illustrate a flow chart for an additional method, according to an embodiment;

Figure 1:
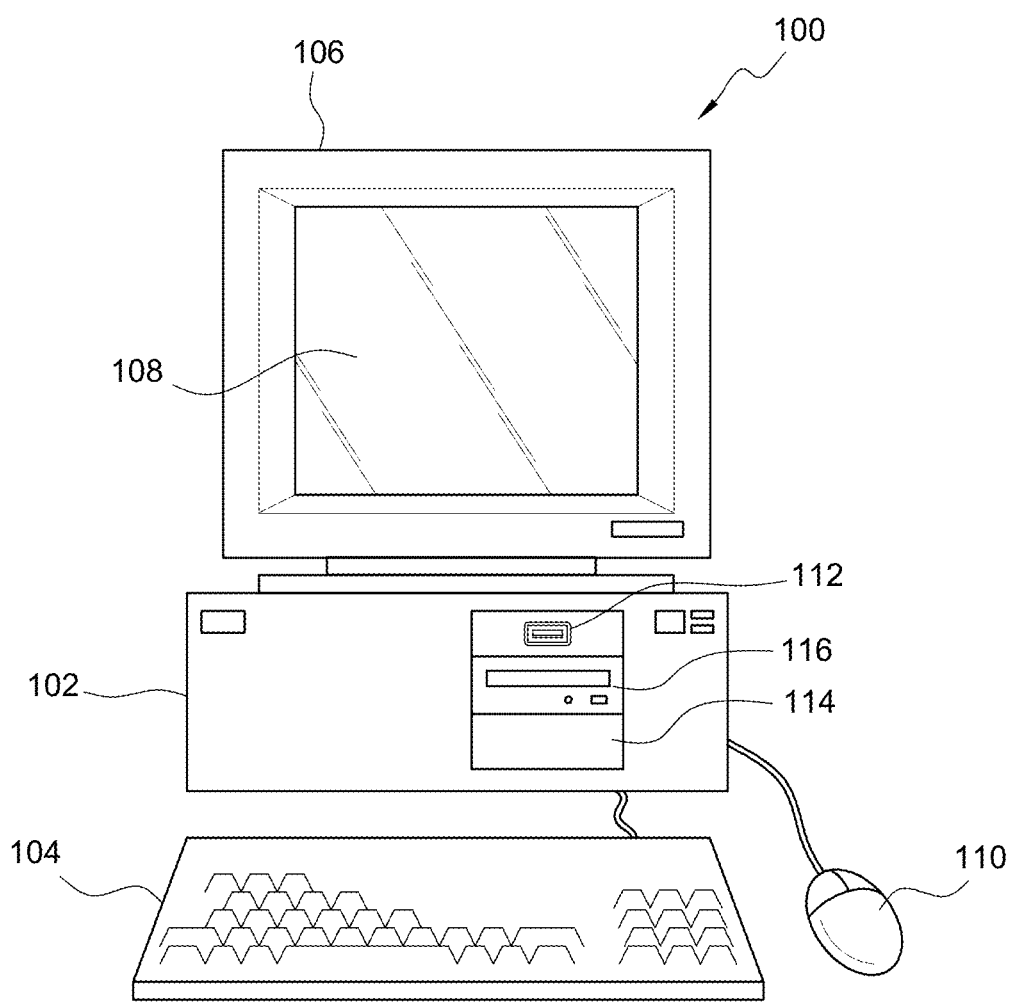
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In many embodiments, "approximately" can mean within plus or minus five percent of the stated value. In further embodiments, "approximately" can mean within plus or minus three percent of the stated value. In yet many embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, one hour, six hours, twelve hours, or twenty-four hours.

Figure 2:
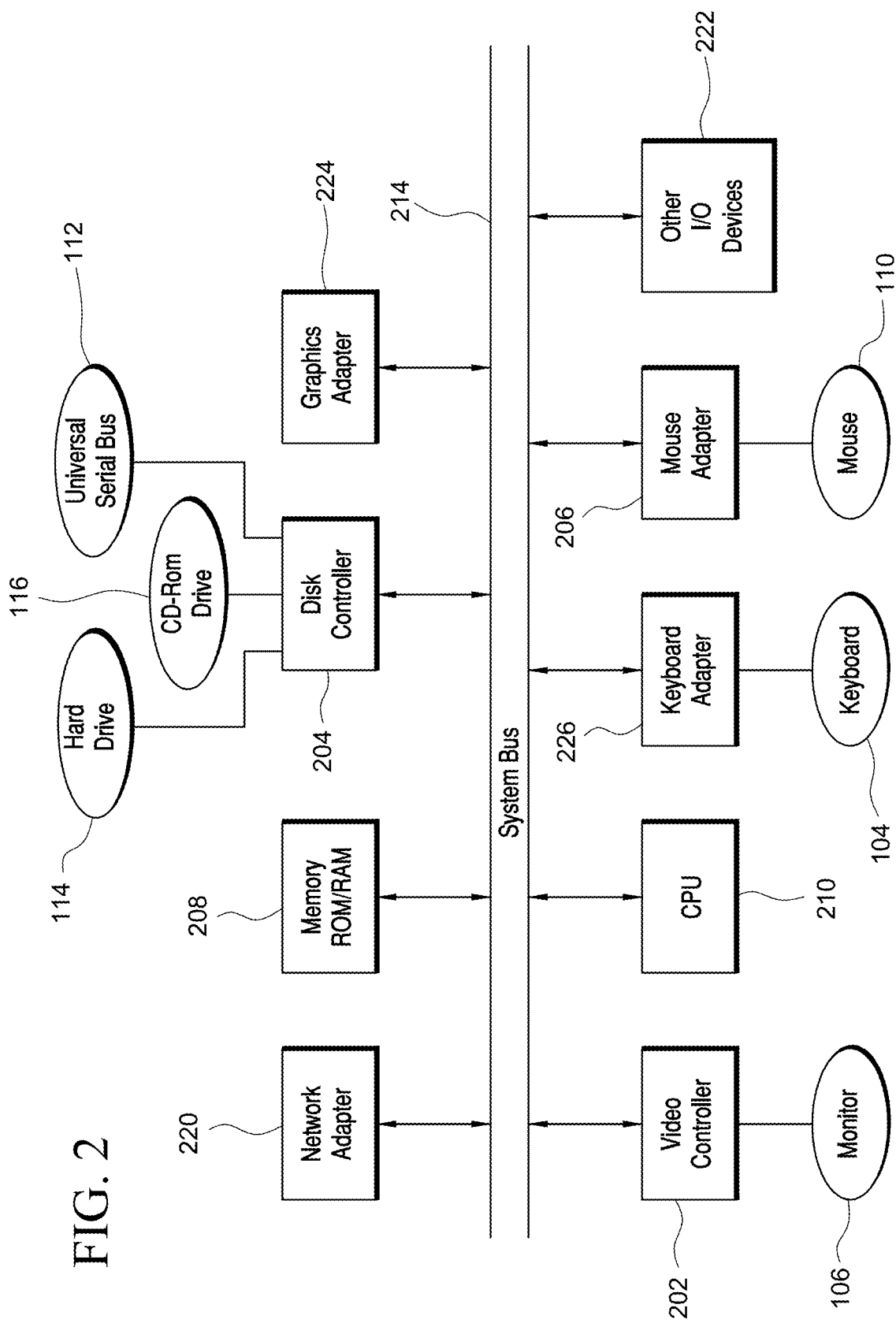
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
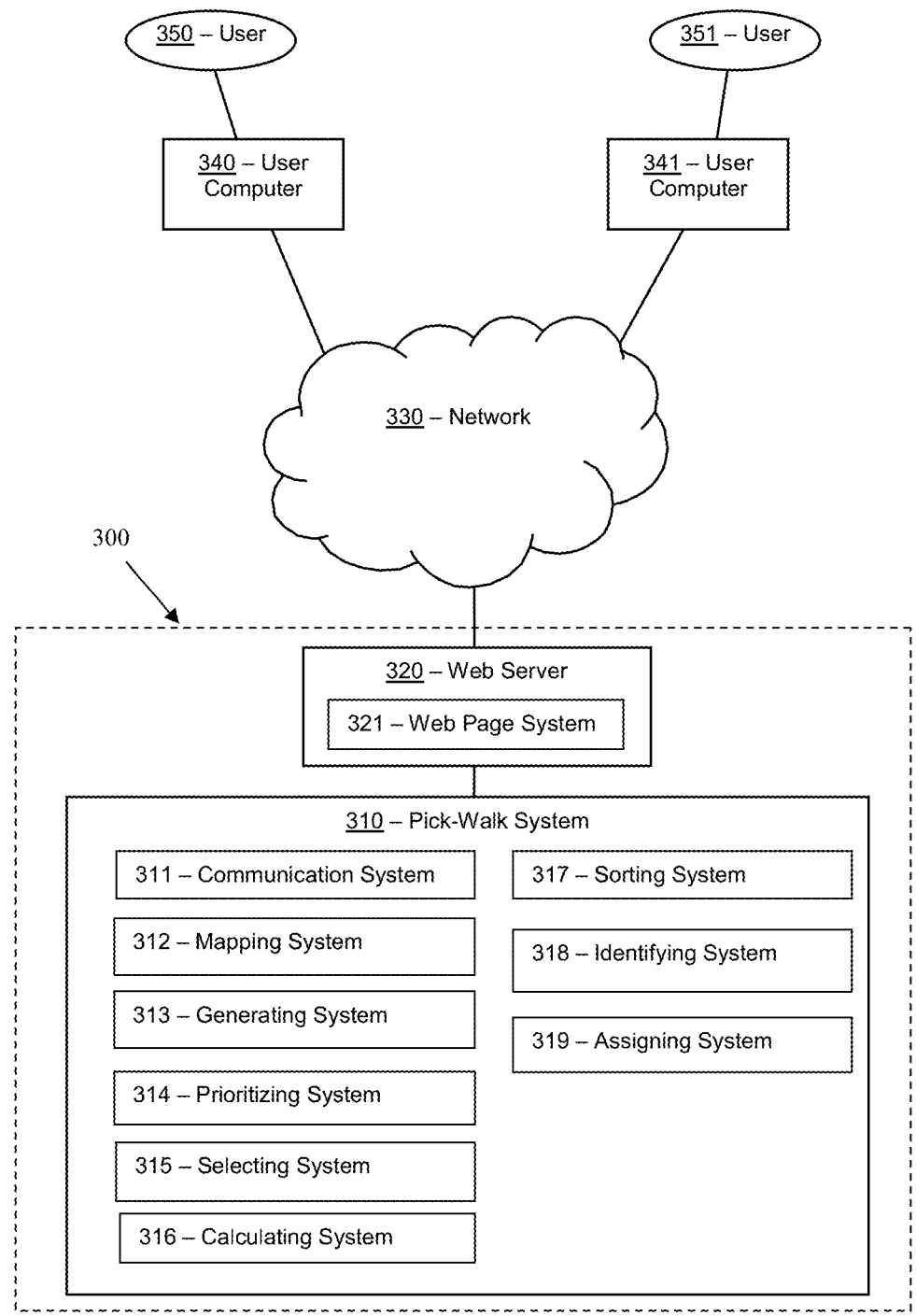
FIG. 3 illustrates a block diagram of a system that can be employed for generating a pick-walk, according to an embodiment.

Turning ahead in the drawings, FIG. 3 illustrates a block diagram of a system 300 that can be employed for a generating two or more pick-walks for a location to fill multiple orders. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a pick-walk system 310 and/or a web server 320. Pick-walk system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, pick-walk system 310 and/or web server 320. Additional details regarding pick-walk system 310 and/or web server 320 are described herein.

In a number of embodiments, each of pick-walk system 310 and/or web server 320 can be a special-purpose computer programed specifically to perform specific functions not associated with a general-purpose computer, as described in greater detail below.

In some embodiments, web server 320 can be in data communication through Network 330 with one or more user computers, such as user computers 340 and/or 341. Network 330 can be a public network, a private network or a hybrid network. In some embodiments, user computers 340-341 can be used by users, such as users 350 and 351, which also can be referred to as store associates, pickers, and/or picking robots, in which case, user computers 340 and 341 can be referred to as picker computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities. In several embodiments, web server 320 can include a web page system 321.

In some embodiments, an internal network that is not open to the public can be used for communications between pick-walk system 310 and/or web server 320 within system 300. Accordingly, in some embodiments, pick-walk system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Meanwhile, in many embodiments, system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, pick-walk system 310 can include a communication system 311, a mapping system 312, a generating system 313, a prioritizing system 314, a selecting system 315, a calculating system 316, a sorting system 317, an identifying system 318, and/or an assigning system 319. In many embodiments, the systems of pick-walk system 310 can be modules of computing instructions (e.g., software modules) stored at non-transitory computer readable media that operate on one or more processors. In other embodiments, the systems of pick-walk system 310 can be implemented in hardware. Pick-walk system 310 can be a computer system, such as computer system 100 (FIG. 1), as described above, and can be a single computer, a single server, or a cluster or collection of computers or servers, or a cloud of computers or servers. In another embodiment, a single computer system can host pick-walk system 310. Additional details regarding pick-walk system 310 and the components thereof are described herein.

Figure 4:
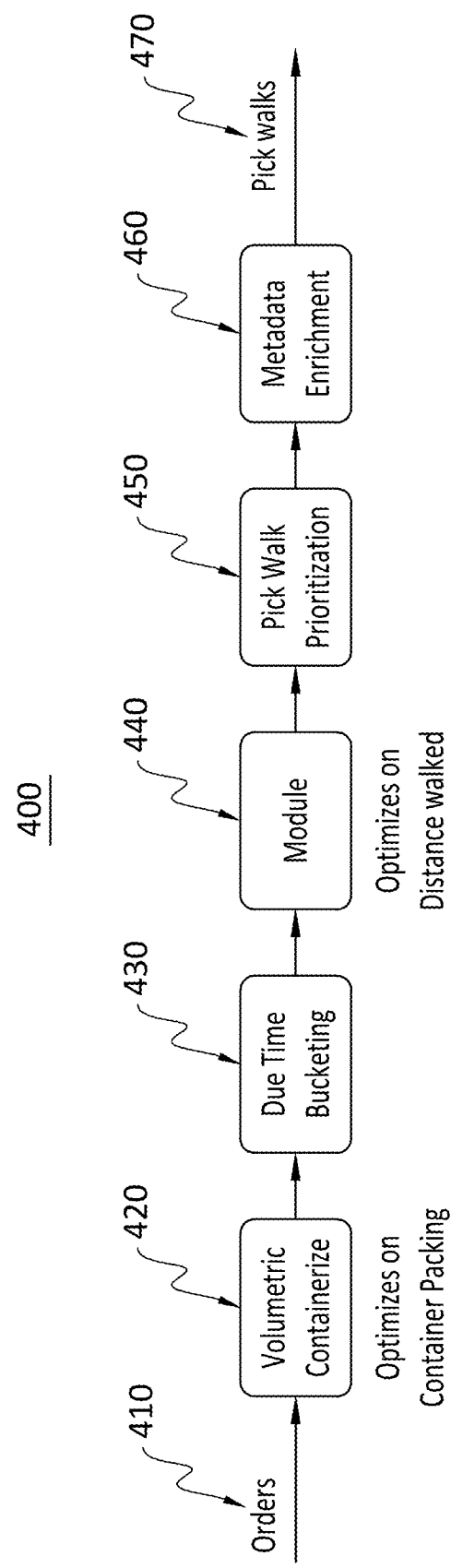
FIG. 4 illustrates a flow chart for a method, according to an embodiment.

Turning ahead in the drawings, FIG. 4 illustrates a flow chart for a method 400 of optimizing a pick-walk, according to an embodiment. Method 400 also can illustrate generating a pick-walk using a series of algorithms within a time window. Method 400 further can illustrate different optimization functions utilized in generating a pick-walk using a series of algorithms within a time window. Method 400 additionally can include using a framework based on a series of algorithms where each algorithm targets a function of the core logic, where one or more parameters can be used to modify the operation of the framework. It enables business to choose the parameters they want to optimize on. Based on the parameters chosen, it forms a chain of algorithms that takes list of orders as input and gives list of pick-walks as output. Method 400 can be similar to method 500 (FIG. 5, described below) and/or method 600 (FIG. 6, described below). Method 400 can be employed in many different embodiments and/or examples not specifically depicted or described herein. In some embodiments, the procedures, the processes, and/or the activities of method 400 can be performed in the order presented or in parallel. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as pick-walk system 310 and/or web server 320.

The processor(s) can be similar or identical to the processor(s) described above with respect to computer system 100 (FIG. 1).

In several embodiments, method 400 can include a block 410 of receiving multiple orders from users (e.g., customers). Block 410 also can include receiving orders from users streamed in real-time 24 hours a day, 7 days a week. In many embodiments, method 400 can proceed after block 410 to a block 420. In many embodiments, block 410 can be implemented as described below in connection with FIG. 5.

In some embodiments, method 400 also can include block 420 of determining a volumetric capacity of each container to store items of each order retrieved by one or more pickers, including using volumetric logic. In many embodiments, method 400 can proceed after block 420 to a block 430. In many embodiments, block 420 can be implemented as described below in connection with FIG. 5 and block 630 (FIG. 6A).

In various embodiments, method 400 further can include block 430 of generating multiple pick-walks to fulfill multiple orders within a particular time window. In some embodiments, block 430 also can include running a series of algorithms to generate each pick-walk, including using time window bucketing logic (e.g., due time bucketing). In several embodiments, method 400 can proceed after block 430 to a block 440. In many embodiments, block 430 can be implemented as described below in connection with FIG. 5.

In a number of embodiments, method 400 additionally can include block 440 of generating pick-walks to optimize a distance travelled by multiple pickers. In many embodiments, block 440 can include generating a route for each picker to follow that optimizes the distance travelled in a location based on the proximity of items stored on shelves on a particular aisle and/or a series of aisles in the location. In several embodiments, a location can include a grocery store, a department store, a distribution center, a warehouse, and/or another suitable location. In various embodiments, method 400 can proceed after block 440 to a block 450. In many embodiments, block 440 can be implemented as described below in connection with FIG. 5.

In several embodiments, method 400 can include block 450 of determining a prioritization order for each pick-walk based on a time constraint of an order, including using prioritization logic. In some embodiments, block 450 determines a priority of multiple pick-walks to assign to multiple pickers in response to one or more requests for a pick-walk. In many embodiments, method 400 can proceed after block 450 to a block 460. In many embodiments, block 450 can be implemented as described below in connection with FIG. 5.

In some embodiments, method 400 can include block 460 of determining metadata enrichment for each pick-walk prior to selecting a particular pick-walk for a particular assignment to pickers. In several embodiments, block 460 can include metadata of each of the times in the pick-walk and/or the pick-walk overall particular to each system, such a system can include a retailer, a manufacturer, a catalog identification, and/or another suitable source of metadata. In various embodiments, block 460 can include tagging each item in the pick-walks with metadata. In many embodiments, block 460 can include monitoring each item in the pick-walks by assessing the metadata of each item. For example, items can be tagged based on: a department of the items, a minimum pick due and/or a maximum pick due of the lines in the pick walk, algorithm parameters used to generate the pick walk, and/or another suitable type of metadata. In many embodiments, method 400 can proceed after block 460 to a block 470. In many embodiments, block 460 can be implemented as described below in connection with FIG. 5

In many embodiments, method 400 can include block 470 of outputting multiple pick-walks, including transmitting such pick-walks to one or more pickers at the location. In many embodiments, block 470 can be implemented as described below in connection with FIG. 5.

Figure 5:
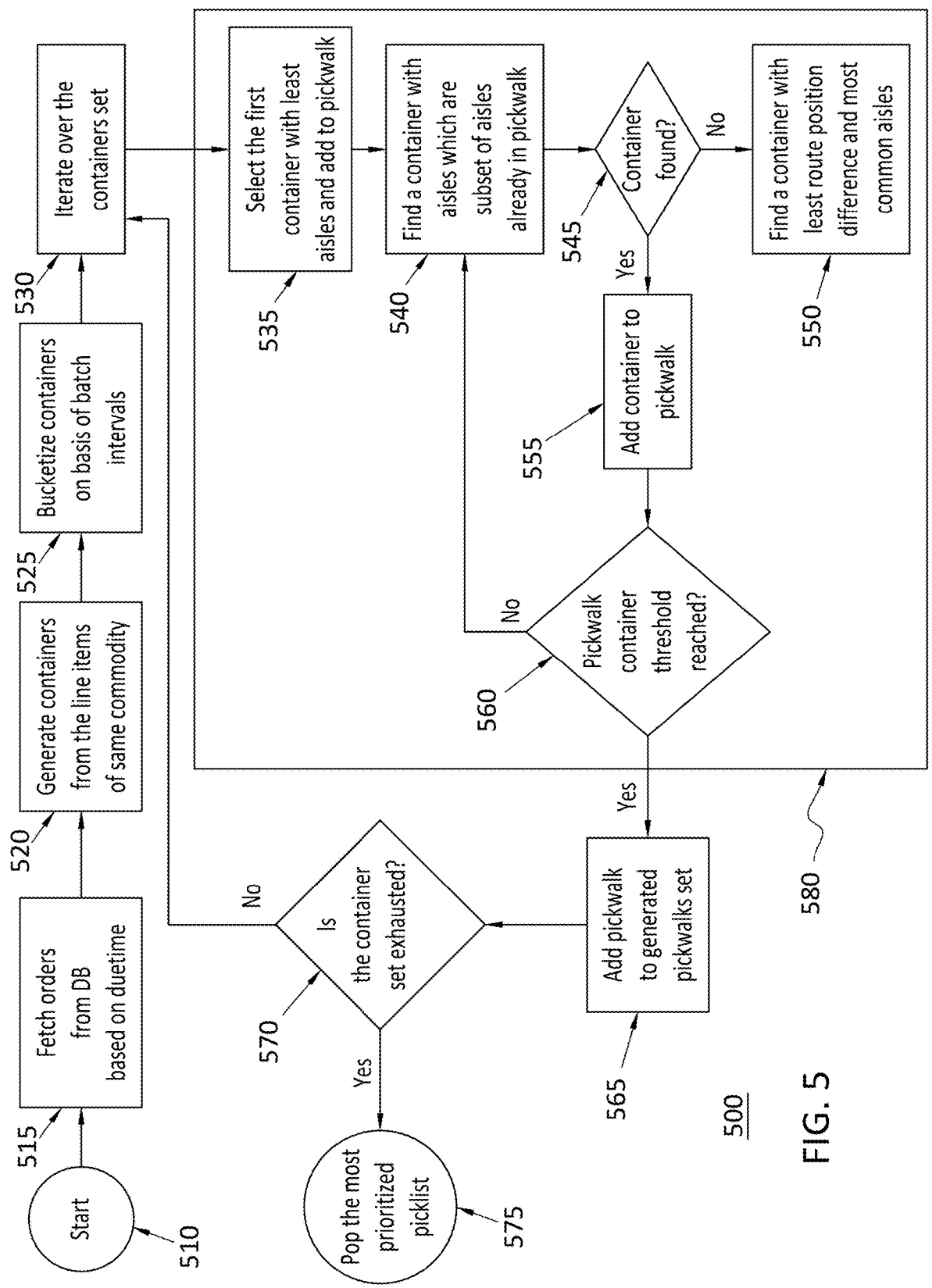
FIG. 5 illustrates a flow chart another method, according to an embodiment.
Figure 6A:
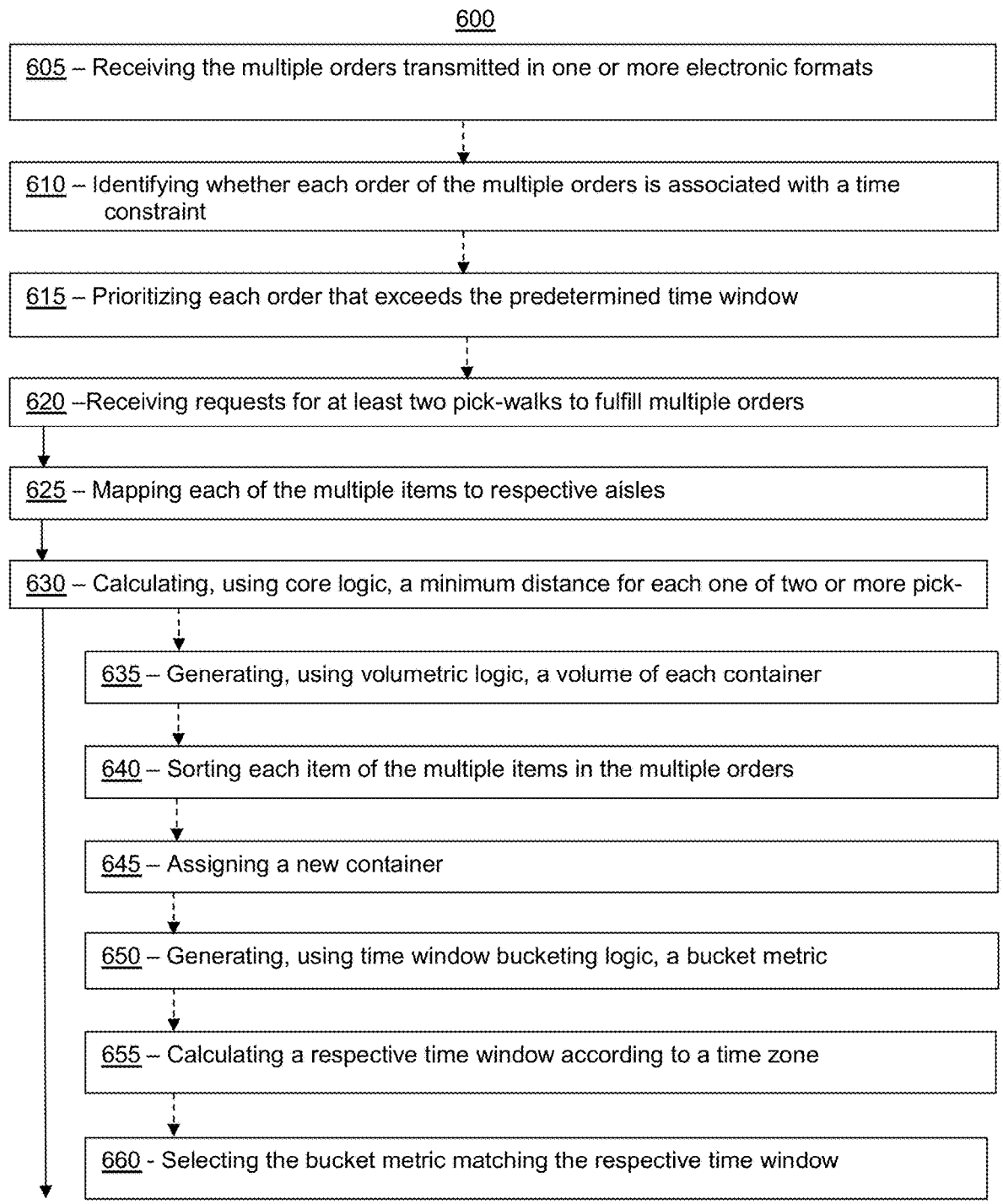

Referring to the drawings, FIG. 5 illustrates a flow chart for another method, according to an embodiment. As an example, a method 500 in FIG. 5 can be a series of chained functions for optimizing a pick-walk. Method 500 also can illustrate a flow diagram utilized in generating a pick-walk using a series of algorithms within a time window. Method 500 can be similar to method 400 (FIG. 4) and/or method 600 (FIG. 6, described below) and/or method 400 (FIG. 4). Method 500 can be employed in many different embodiments and/or examples not specifically depicted or described herein. In some embodiments, the procedures, the processes, and/or the activities of method 500 can be performed in the order presented or in parallel. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as pick-walk system 310 and/or web server 320. The processor(s) can be similar or identical to the processor(s) described above with respect to computer system 100 (FIG. 1).

In several embodiments, method 500 can begin with a block 510 of receiving a request for a pick-walk from a picker. In many embodiments, method 500 can proceed after 510 to a block 515.

In various embodiments, method 500 also can include block 515 of fetching orders based on a time constraint of the order. In many embodiments, block 515 can include identifying time constraints of each order to fulfill each order within a respective time window. In some embodiments, block 515 can fetch orders stored in a database, a cache memory, and/or another suitable electronic storage device. In many embodiments, method 500 can proceed after block 515 to a block 520.

In a number of embodiments, method 500 further can include block 520 of generating multiple containers to assign to pickers that can hold items of a same commodity type (e.g., category). In several embodiments, items from a single order can be retrieved using different containers picked by multiple pickers at a location. In many embodiments, method 500 can proceed after block 520 to a block 525.

In several embodiments, method 500 can include block 525 of generating bucket metrics for a time window for each container. In some embodiments, each bucket can include one or more batch intervals based on time windows of each order. In many embodiments, method 500 can proceed after block 525 to a block 530.

In various embodiments, method 500 can include block 530 of running multiple iterations of each container in a set of containers until each container is volumetrically maximized (i.e., the container holds at least a threshold volume (or at least a minimum percentage of the maximum volume) of product(s)). In some embodiments, each iteration of the multiple iterations of each container in a set of containers utilizes information learned from each previous iteration (or at least one previous iteration) of the multiple iterations until each container (or at least a minimum number or percentage of containers) is volumetrically maximized and the iterative process completes. In several embodiments, running the multiple iterations of block 530 can include one or more separate iterative processes as illustrated by a block 580 until each container (or at least a minimum number or percentage of containers) is volumetrically maximized. In many embodiments, each iteration run within block 580 can include a block 535, a block 540, a block 545, a block 550, a block 555, and a block 560. In many embodiments, method 500 can proceed after block 530 to a block 535.

In several embodiments, method 500 can include block 535 of selecting a first container with items located on a least number of aisles from the set of aisles in a location. In some embodiments, block 535 also can include adding a first container with items located on a least number of aisles from the set of aisles in a location. In various embodiments, method 500 can proceed after block 535 to block 540.

In some embodiments, method 500 can include block 540 of finding a container with items located on a subset of aisles from a number of aisles on the route generated by a pick-walk. In many embodiments, method 500 can proceed after block 540 to block 545.

In a number of embodiments, method 500 can include block 545 of determining whether or not a container is volumetrically maximized. If block 545 is yes, method 500 can proceed to block 555. Otherwise, if block 545 is no, method 500 can proceed to block 550.

In several embodiments, method 500 can include block 555 of adding a container that is volumetrically maximized to a pick-walk. In many embodiments, method 500 can proceed after block 555 to block 560.

In some embodiments, method 500 can include block 550 of finding a container with (i) a least route position difference and (ii) a maximum number of common aisles. In many embodiments, method 500 can proceed after block 550 to block 555.

In various embodiments, method 500 can include block 560 of determining whether or not each pick-walk meets a container threshold. If block 560 is yes, method 500 can proceed to a block 565. Otherwise, if block 560 is no, method 500 can return to block 540. In several embodiments, method 500 can proceed after block 560 to a block 565.

In some embodiments, method 500 can include block 565 of adding a pick-walk to a set of pick-walks. In several embodiments, block 565 can include generating a set of pick-walks based on a time window. In many embodiments, method 500 can proceed after block 565 to a block 570.

In various embodiments, method 500 can include block 570 of determining whether a container of the set of containers are exhausted. If block 570 is yes, method 500 can proceed to a block 575. Otherwise, if block 570 is no, method 500 can return to block 530. In many embodiments, method 500 can proceed after block 570 to block 575.

In several embodiments, method 500 can include block 575 of populating a list of pick-walks by a prioritized sequence of orders based on a time window.

Turning ahead in the drawings, FIGS. 6A and 6B illustrate a flow chart for a method 600, according to another embodiment. In some embodiments, method 600 can be a method of automatically generating optimized pick-walks, using core logic, to minimize the time taken to pick items from a location. Method 600 is merely exemplary and is not limited to the embodiments presented herein. Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 400 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as pick-walk system 310 and/or web server 320. The processor(s) can be similar or identical to the processor(s) described above with respect to computer system 100 (FIG. 1).

Referring to FIG. 6A, method 600 can include an optional block 605 of receiving the multiple orders transmitted in one or more electronic formats. In some embodiments, the one or more electronic formats can include text-based or image-based content. In many embodiments, receiving the multiple orders can include using one or more electronic methods of transmission, such as a streaming server in real-time. In various embodiments, each of the multiple orders can include online orders using various electronic computing devices, such as a mobile device, a headset device, a laptop computer, a surface tablet, and/or another suitable electronic method of transmission. Block 605 can be similar or identical to the activities described in block 510 (FIG. 5).

In several embodiments, method 600 (FIG. 6A) also can include an optional block 610 of identifying whether each order of the multiple orders is associated with a time constraint within a predetermined time window. In some embodiments, the time constraint can include a pick-up time. In various embodiments, a pick-up time can include an order picked up in-store by a customer or picked up by a delivery service to a predefined location. In many embodiments, the time constraint can be a delivery time, a predetermined time period, a predetermined time window, and/or another suitable time constraint. Block 610 can be similar or identical to the activities described in block 430 (FIG. 4) and/or block 515 (FIG. 5).

In various embodiments, method 600 (FIG. 6A) further can include an optional block 615 of prioritizing each order that exceeds the predetermined time window to be added to the at least two pick-walks based on the time constraint. Block 615 can be similar or identical to the activities described in block 430 (FIG. 4) and/or block 515 (FIG. 5).

In some embodiments, method 600 (FIG. 6A) can include a block 620 of receiving requests for at least two pick-walks to fulfill multiple orders at a location. In many embodiments, each of the multiple orders can include at least one respective item. In several embodiments, the multiple orders can include multiple items. In some embodiments, the multiple items of the multiple orders are located within the at least the single portion of the location.

In some embodiments, a pick-walk can include a collection of containers generated for one or more pickers to retrieve a set of items at a location a single walk. In various embodiments, a pick-walk can include a route and/or instructions for the picker to retrieve the items on the pick-walk in a predetermined order and/or sequence to minimize travel time. In a number of embodiments, a picker requests a pick-walk in real-time prior to retrieving the items in the containers to incorporate order changes, quantity changes, time constraints, cancellations, and/or another suitable modification to an order. In some embodiments, requesting pick-walks in real time can be advantageous to minimize redundant efforts to retrieve an incorrect number of items during each pick-walk. In several embodiments, a low latency nature of the core logic (e.g., algorithm) can be used on dynamic order pools. In some embodiments, an advantage to receiving requests for pick-walks in real-time allows a pick-walk to be generated using up-to-date orders where a state of an order can change any time before the orders are fulfilled. In various embodiments, block 620 can be similar or identical to the activities described in block 510 (FIG. 5).

In a number of embodiments, method 600 (FIG. 6A) can include a block 625 of mapping each of the multiple items to respective aisles within at least a single portion of the location. In several embodiments, a single portion can include a vegetable section, a paper products section, a canned (dry) goods section, a sporting goods section, and/or another suitable portion of a location. In many embodiments, generating optimized pick-walks can be based on using knowledge of an organized system of aisles and shelved laid out in a location. In various embodiments, using the knowledge can include knowledge of item placement on display racks and knowledge of the relative positioning of the display racks located on aisles. In a number of embodiments, items can be placed on shelves and/or racks on an aisle of a set of ordered aisles at a location. Block 625 can be similar or identical to the activities described in block 420 (FIG. 4) and block 520 (FIG. 5).

In various embodiments, a container can refer to a collection of items from an order placed in a bin and/or storage unit, wherein the items can be retrieved using the container to fulfill the order.

In several embodiments, aisle range logic can expressed as algorithm 1, as follows:

(1)

Input - List of Containers $C = \{C_1, C_2, C_3 ... C_N\}$.

1. Each Container $C_i$ contains items which belongs to a set of Aisles. These Aisles are stored in a sorted order such that each it forms an aisle set $A = [A_p ...A_t ...A_z]$ where $(A_t - A_p) < (A_z - A_p)$.

2. Until Containers are exhausted keep generating pick-walks.

3. Sort all container by Aisle ID. Pick first container to start the pick-walk

4. Until pick-walk with Aisles $A_i = [X_1, X_2, X_3 ... X_N]$ is full (is under configured thresholds like max containers, max item quantity etc.)

I.    Execute a Find operation to choose a Container $C_j$ with aisles $A_j = [Y_1, Y_2, Y_3 ... Y_N]$ from remaining Containers using below rules
- $Y_1 >= X_1$ AND $Y_N <= X_N$
- Min (Max($Y_N$, $X_N$), Min($Y_1$,$X_1$))

II.   Execute a Union operation to combine the set of Aisles together optimally.

III.  Once the required threshold is reached, the pick-walk is marked optimized and added to the result.

Where, a Min(Max($Y_N$, $X_N$), Min($Y_1$, $X_1$)), refers to calculating the difference between the farthest aisles from the at least two aisles in the aisle range, and combining the 2 aisle sets refers to Ai=[$X_1$, $X_2$, $X_3$ . . . $X_N$] and $A_j$=[$Y_1$, $Y_2$, $Y_3$ . . . $Y_N$].

In several embodiments, method 600 (FIG. 6A) can include a block 630 of calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks. In some embodiments, two or more pick-walks can be revised through multiple iterations based on receiving one or more additional items of one or more additional orders until each container (or at least a minimum number or percentage of containers) assigned to each of the two or more pick-walks is volumetrically maximized with the multiple items of the multiple orders and the one or more additional items of the one or more additional orders. In various embodiments, each iteration of the multiple iterations conducted for each container based on receiving the one or more additional items of the one or more additional orders utilizes information learned from each previous iteration (or at least one previous iteration) until each container (or at least a minimum number or percentage of containers) assigned to each of the two or more pick-walks is volumetrically maximized with the multiple items of the multiple orders and the one or more additional items of the one or more additional orders and the iterative process completes.

In several embodiments, the one or more additional items of the one or more additional orders are located within the at least the single portion of the location. In various embodiments, block 630 can include using department or zone commonality where when aisle data is unavailable. In many embodiments, the core algorithm can generate pick-walks using zone level data of a location, such as departments in store or warehouse location. Block 630 can be similar or identical to the activities described in block 440 (FIG. 4) and/or block 535-575 (FIG. 5).

In various embodiments, a container can refer to a collection of items from an order placed in a bin and/or storage unit, wherein the items can be retrieved using the container to fulfill the order.

In many embodiments, generating a pick-walk using the minimum attributes and/or parameters available for a given store can include using a combination of both the aisle commonality and the aisle proximity using core logic. In several embodiments, block 630 (FIG. 6A) can include an ultra-lean infrastructure set up based on the infrastructure setup of the aisles being grouped together and labeled (e.g., assigned) a sequence number. As an example, an ultra-lean infrastructure can include utilizing minimum resources to compute an optimal path between two or more consecutive items as listed in a pick-walk. As another example, generating a pick-walk can be dependent upon placement of each item stored on an aisle location. One or more items can be located (e.g., belong) in the same proximity zone to create a subset of items listed on the optimized pick-walk. As a further example, two or more items can belong to multiple zones, such as Aisle A1, Aisle A2 and Aisle B3. An item belonging to Aisle A1 and other items belonging to Aisle A2 can be selected for a pick-walk due to aisle proximity between Aisle A1 and A2 over an item belonging to Aisle B3 due to aisle proximity from Aisle B3 to Aisle A1 being more than a distance from Aisle A1 to Aisle A2. In some embodiments, the ultra-lean infrastructure set up can be advantageous as the set up does not depend on the precision of each location of the item among the respective aisles grouped together.

In several embodiments, core logic can expressed as algorithm 2, as follows:

(2)

Input - List of Containers C = {$C_1, C_2, C_3 \ldots C_n$}.
1. Each Container $C_i$ contains items which belong to a set of aisles. The set of aisles can be stored in a sorted order such that each aisle forms a set of aisles, such as A = [$A_p \ldots A_t \ldots A_z$] where ($A_t - A_p$) < ($A_z - A_p$).
2. Until Containers are exhausted keep generating pick-walks.
3. For starting a new pick-walk, choose a container using criteria, such as:
   I. Min(size(A)) – container having min no of aisles.
   II. Min($A_z - A_p$) – container having min relative distance between aisles.
4. Until a pick-walk with aisles $A_i$ is full ( e.g, under configured thresholds like max containers, max item quantity, and/or other thresholds):
   I. Execute a Find operation to choose a Container $C_j$ with aisles $A_j$ from remaining Containers using the rules, below:
     • Aisle Commonality :
       • $A_j$ is subset of $A_i$
       • Max(Size(Intersection( $A_i, A_j$ )))
     • Aisle proximity : Union( $A_i$, Aj ) -> Min($A_z = A_p$ )
   II.  Execute a Union operation to combine the set of aisles together optimally.
   III. Output: Once the required threshold is reached, the pick-walk can be marked optimized and added to the result.

Where, a Min($A_z - A_p$) refers to an aisle set, wherein an aisle set can be represented as A=[$A_p$ . . . $A_t$ . . . $A_z$], where ($A_t - A_p$)<($A_z - A_t$). ($A_z - A_p$) represents the difference between 2 farthest aisles in the aisle set, where the core logic equation finds the container with minimum difference between the farthest aisles away from an aisle in the aisle set at the location.

Where, an Aj refers to a subset of Ai, an Aj and Ai represent that there are 2 aisles sets. This statement checks if all the aisles in the aisle set $A_j$ also exist in aisle set $A_i$. Where, the equation refers to finding the container with an aisle set which includes all the aisles previously present in the pick-walk presently processed in that loop.

Where, a Max(Size(Intersection($A_i, A_j$))) refers to $A_j$ and $A_i$ representing that there are 2 aisles sets, an 'Intersection' finds the set of aisles which are common in the 2 aisle set ($A_i, A_j$) passed to the function, and a 'Size' is same as explained above. Where, the equation refers to finding the container with an aisle set which includes a maximum number of aisles previously present in the pick-walk which is presently processed in that loop.

Where, a Union($A_i$, $A_j$) refers to $A_j$ and $A_i$ representing that there are 2 aisles sets, and a 'Union' finds the set of distinct aisles which are present in the 2 aisle set ($A_i$, $A_j$) passed to the function.

In various embodiments, the terms and/or references to aisle sets provided throughout the core logic represents a set of respective identification markers used to identify each shelf of multiple shelves (e.g., racks) on which the items are placed on respective aisles of the set of aisles in a location. Such a location can include a store, a warehouse, a distribution center, and/or another suitable facility using an organized aisle system. In many embodiments, the terms and/or references to container sets represent the list of containers (e.g., bins and/or storage units) in which items can be picked, packed, and/or transported for location. In several embodiments, the term "Min" (Minimum) refers to a function that will return the minimum number among all the values passed to it. In some embodiments the term "Max" refers to function that will return the maximum number among all the values passed to it.

In some embodiments, aisle commonality can include a container similarity ratio metric. In several embodiments, the container similarity ratio can be calculated for containers based on aisle commonality where pick-walks can be generated by grouping containers with a highest similarity ratio. In many embodiments, grouping containers with a highest similarity ratio can be advantageous when a particular design layout of a location includes aisles spaced in a condensed configuration and/or spaced close together in the location.

In a number of embodiments, container similarity ratio logic can expressed as algorithm 3, as follows:

(3)

Input - List of Containers = ($C_1$, $C_2$, $C_3$ ... $C_n$}. Container: max container ($C_{max}$)
1. Each Container $C_i$ contains items which belongs to a set of aisles. These aisles are stored in a sorted order such that each it forms an aisle set A = [$A_p$ ...$A_t$ ...$A_z$] where ($A_t - A_p$) < ($A_z - A_p$).
2. For each container, find ($C_{max}$) − 1 container from remaining set using following calculation for container similarity ratio:
    Size (Intersection($A_i$, $A_j$ )) / Size (Union($A_i$, $A_j$ ))
3. Choose the set with maximum container similarity from step (2).
4. Until containers are exhausted run step (2) and (3)

Where, an Intersection($A_i$, $A_j$))) refers to $A_j$ and $A_i$ that represents that there are 2 aisles set, an 'Intersection' refers to finding the set of aisles which are common in the 2 aisle set ($A_i$, $A_j$) passed to the function, a Union($A_i$, $A_j$), refers to $A_j$ and $A_i$ that represents that there are 2 aisles sets, a 'Union' refers to finding the set of distinct aisles which are present in the 2 aisle set ($A_i$, $A_j$) passed to the function, a Size(A)) represents an aisle set which can have one or more aisles/racks/shelves, and a 'Size(A)' refers to calculating a given number of elements in the list A, which in this case refers to a number of aisles in the aisle set.

In a number of embodiments, method 600 (FIG. 6A) can include a block 630, using the core logic, can include receiving a list of containers. In many embodiments, each container of the list of containers can include one or more items located on at least one aisle of a set of aisles in the location.

In various embodiments, block 630 (FIG. 6A), using the core logic, also can include prior to generating a pick-walk of the at least two pick-walks, selecting the each container of the list of containers based on at least (i) a minimum number of aisles to retrieve the one or more items in each container and (ii) a minimum relative distance between the minimum number of aisles.

In many embodiments, block 630 (FIG. 6A), using the core logic, further can include generating the pick-walk for the at least one aisle of the set of aisles based on selecting the container.

In some embodiments, the respective aisle commonality can include selecting a container mapped to a subset location of a particular aisle of the set of aisles.

In several embodiments, the respective aisle commonality also can include calculating an intersection distance between the subset location and the particular aisle.

In various embodiments, the respective aisle proximity can include determining a proximity distance between the set of aisles based on a physical layout of the location. In some embodiments, the proximity distance can include a union of the set of aisles that is less than or equal to a minimum proximity distance between the set of aisles.

In a number of embodiments, block 630 (FIG. 6A) can include using a sequence identification (ID). In many embodiments, a sequence ID can be a number denoting the relative distances of aisles to one another. In some embodiments, containers can be sorted by a minimum sequence ID followed by maximum sequence ID. In several embodiments, containers can be grouped into pick-walks with a goal of minimizing the overlapping sequence ID range that pick-walks will traverse.

In several embodiments, block 630 (FIG. 6A) also can include using an average sequence identification (ID). In some embodiments, containers can be sorted based on the average sequence IDs (e.g., taking an average of the aisle set) where pick-walks can be generated from an ordered list. In many embodiments, using an average sequence ID can be advantageous when used for a layout of a location where distances between each aisles are random rather than uniformly spaced.

In various embodiments, the respective aisle commonality further can include determining a relationship metric between the subset location and the particular aisle, wherein the intersection distance falls below a predetermined threshold.

In a number of embodiments, in block 630 (FIG. 6A), the calculating the minimum distance for each one of the two or more pick-walks to fulfill the multiple orders, can include determining the respective maximum number of containers for each pick-walk of the at least two pick-walks. In some embodiments, at least two containers of the respective maximum number of containers can be revised in multiple iterations based on receiving the one or more additional items of the one or more additional orders until the at least two containers assigned to each of the two or more pickwalks can be volumetrically maximized with the multiple items of the multiple orders and the one or more additional items of the one or more additional orders. In various embodiments, each iteration of the multiple iterations conducted for each container based on receiving the one or more additional items of the one or more additional orders utilizes information learned from each previous iteration (or at least one previous iteration) until the at least two containers assigned to each of the two or more pick-walks can be volumetrically maximized with the multiple items of the multiple orders and the one or more additional items of the one or more additional orders and the iterative process completes. In several embodiments, each of the at least two containers volumetrically maximized can include meeting a respective predetermined container volume threshold. Block 630 can be similar or identical to the activities described in blocks 540, 545, 550, and/or 555 (FIG. 5).

Prior to generating the at least two pick-walks, in many embodiments, method 600 (FIG. A) and/or block 630 can include an optional block 635 of generating, using volumetric logic, a volume of each container assigned to each of the two or more pick-walks based on a respective number of items from each of the multiple orders mapped to a set of aisles. In some embodiments, each respective item dimension of the multiple items can be aligned with each container dimension of the each container assigned to each of the two or more pick-walks to find a maximum quantity of the multiple items to fit the each container dimension. In various embodiments, the items of each order can be packed into containers following volumetric calculations. In many embodiments, such containers can be grouped into pick-walks of maximum N containers each. In some embodiments, generating pick-walks can be subject to additional parameters and/or conditions. In various embodiments, generating pick-walks can include adding additional constraints such as maximum quantities, maximum weights, additional time constraints, and/or another suitable constraint for the pick-walks. In some embodiments, pick-walks can be created regularly with very low latencies (e.g., >5 ms) to adjust to changes in order states and/or demand for items. Block 635 can be similar or identical to the activities described in block 420 (FIG. 4) and/or block 525 (FIG. 5).

In various embodiments, method 600 (FIG. 6A) can include an optional block 635 can use bin optimization techniques based on a volumetric logic algorithm to provide an optimized fill of items per container. In a number of embodiments, volumetric logic can expressed as algorithm 4, as follows:

$$(4)$$

Input - List of Order $O = (O_1, O_2, O_3 \ldots O_n)$.
1. Each order $O_i$ contains items which belongs to a set of aisles. The set of aisles can be stored in a sorted order such that each it forms an aisle set $A = [A_p \ldots A_t \ldots A_z]$ where $(A_t - A_p) < (A_z - A_p)$.
2. For each order, generate containers, as follows:
    I. Sort items by aisle sequence
    II. Until items of the order are exhausted:
        a. Assign new containers to the order
        b. Check volumetric constraints for the item. If item can fit add item to container else go back to step (a).
3. For items which are ordered in large quantities and cannot fit in one container
    I. For each of the six orientations in which an item can be placed in a container, align each of the item dimension against the container dimension and find the max quantity that can fit along that dimension.
       Total quantities can be the product of maximum quantities that can be placed across all the three dimensions, such as depth, height, and width:
        a. floor $(H_{container} / H_{item})$ * floor $(W_{container} / W_{item})$
           * floor $(D_{container} / D_{item})$
    II. Find the maximum quantity among the quantities computed for every orientation based on the above formula.
    III. If the total volume of the item (product of single quantity volume and quantity computed in step (3.II)), exceeds the upper threshold volume of the container, update the quantity:
        a. if(computed quantity * $V_{singleQuantity}$) >
           $V_{upper}$, then update quantity to ceil( $V_{upper} / V_{singleQuantity}$)
    IV. If the total volume of the item (product of of single quantity volume and quantity computed in step (3.III)), is less than the lower threshold volume of the container, update the quantity:
        I. if (computed quantity* $V_{singleQuantity}$) < $V_{lower}$, then update to floor($V_{lower} / V_{singleQuantity}$)
    V. Based on the computed quantity in step IV, the minimum container count can be: ceil ($Q_{total}$/computed quantity)
    VI. All containers can fit the computed quantity. The quantity for a last container can be adjusted, based on the total item quantities.

Where, the six orientations refer to the ways in which an item can be placed in six different ways in a container (e.g., bin or storage unit). For example, considering an item as a box with six sides, a new orientation can be generated by using each of the sides as the bottom for placing it into a container.

Where, an order set represents the orders placed by users and/or customers to be optimized as part of at least one pick-walk to fulfill the order along with multiple orders, a D stands for Depth, such as, $D_{container}$ represents a depth of a container while $D_{item}$ represents depth of an item, a W stands for Width, such as, $W_{container}$ represents width of a container while $W_{item}$ represents width of an item, and an H stands for Height, such as, $H_{container}$ represents height of a container while $H_{item}$ represents height of an item.

Where, a floor operation refers to rounding down a number to its nearest whole value, as an example, floor(3.4)=3, a ceil operation refers to rounding a number up to its nearest whole value, as an example floor(3.4)=4, a $V_{singleQuantity}$ refers to the unit of an item ordered, for example, when an item is ordered, it can be requested in 1 unit or multiple units (e.g., a user can order 10 bottles of water), a $V_{singleQuantity}$ can include using a volumetric calculation for a volume of a single unit or quantity, a $V_{singleQuantity}$ can stands for volume of a single quantity of the item, a $V_{upper}$ refers to a Maximum container fill threshold, and a $V_{lower}$ refers to a Minimum container fill threshold.

In various embodiments, the terms and/or references to aisle sets provided throughout the volumetric logic represents a set of respective identification markers used to identify each shelf of multiple shelves (e.g., racks) on which the items are placed on respective aisles of the set of aisles in a location. Such a location can include a store, a warehouse, a distribution center, and/or another suitable facility using an organized aisle system. In many embodiments, the terms and/or references to container sets represent the list of containers (e.g., bins and/or storage units) in which items can be picked, packed, and/or transported for location. In several embodiments, the term "Min" (Minimum) refers to a function that will return the minimum number among all the values passed to it. In some embodiments the term more pick-walks. In various embodiments, when a total volume of the each item exceeds a volume threshold of the container then decrease the maximum quantity of the items for the each container assigned to each of the two or more pick-walks.

In some embodiments, for items of the multiple items ordered in quantities exceeding a size threshold for each container assigned to each of the two or more pick-walks, block 645 (FIG. 6A) further can include outputting a minimum container count for the items.

Prior to generating the at least two pick-walks, in several embodiments, prior to generating the at least two pick-walks, method 600 (FIG. 6A) can include an optional block 650 of generating, using time window bucketing logic, a bucket metric for a time window. In some embodiments, input for generating the bucket metric can include a timestamp for each container of the respective maximum number of containers. In various embodiments, each item of the each container of the respective maximum number of containers can be part of an order of the multiple orders. In many embodiments, generating the bucket metric for the time window can be based on one or more rules. (rules see core logic for two rules to add here)

In various embodiments, time window budgeting logic, can expressed as algorithm 5, as follows:

$$
\begin{aligned}
&\text{Input - List of Containers} = \{C_1, C_2, C_3, \ldots C_n\}, \text{ timestamp bucketing information} \\
&\text{1. Each Container } C_i \text{ contains items which belongs to a single order and hence} \\
&\quad \text{belong to a single due time.} \\
&\text{2. Create a bucket for due times} \\
&\quad \text{I. If exists for each entry in the list of start and end timestamp.} \\
&\quad \text{II. Else if exists minutes per bucket, create buckets} = 1440/\text{ input of} \\
&\quad\quad \text{minutes per bucket (across 24 hours)} \\
&\quad \text{III. Else, create hourly buckets for 24 hours of the current day} \\
&\text{3. For each container} \\
&\quad \text{I. Calculate due time according to the store/warehouse local time zone.} \\
&\quad \text{II. Add to the bucket which caters to timestamp calculated in step (3.I).}
\end{aligned}
\tag{5}
$$

"Max" refers to function that will return the maximum number among all the values passed to it.

In many embodiments, prior to generating the at least two pick-walks, method 600 (FIG. 6A) and/or block 630 can include an optional block 640 of sorting each item of the multiple items in the multiple orders mapped to a respective aisle of the set of aisles until the multiple items of the multiple orders are exhausted.

In many embodiments, prior to generating the at least two pick-walks, method 600 (FIG. 6A) and/or block 630 can include an optional block 645, when there are one or more items of the multiple orders remaining after the sorting, assigning a new container to exhaust the one or more items of the multiple orders.

In some embodiments, for items of the multiple items ordered in quantities exceeding a size threshold for each container assigned to each of the two or more pick-walks, block 645 (FIG. 6A) can include determining, using an algorithm, a number of physical configurations in which the each item of the items fits into each container dimension of the each container assigned to each of the two or more pick-walks.

In many embodiments, for items of the multiple items ordered in quantities exceeding a size threshold for each container assigned to each of the two or more pick-walks, block 645 (FIG. 6A) also can include determining a maximum quantity of the items for the each container assigned to each of the two or more pick-walks based on the number of physical configurations. In several embodiments, when a total volume of the each item exceeds a volume threshold of the container then decrease the maximum quantity of the items for the each container assigned to each of the two or In many embodiments, prior to generating the at least two pick-walks, method 600 (FIG. 6A) and/or block 630 can include an optional block 655 of, for the each container of the respective maximum number of containers, calculating a respective time window according to a time zone of the location.

In many embodiments, prior to generating the at least two pick-walks, method 600 (FIG. 6A) and/or block 630 can include an optional block 660 of selecting the bucket metric matching the respective time window.

In various embodiments, continuing with FIG. 6B, method 600 further can include a block 665 of generating the at least two pick-walks based on the two or more pick-walks. In the embodiment illustrated in FIGS. 6A and 6B, block 665 in FIG. 6B occurs after block 630 in FIG. 6A. In several embodiments, each of the at the least two pick-walks in block 665 of FIG. 6B can identify a respective route for each of at least two pickers to retrieve the multiple items of the multiple orders and the one or more additional items of the one or more additional orders. In various embodiments, each of the at least two pickers can retrieve items of a single order of the multiple orders or of the one or more additional orders.

In a number of embodiments, block 665 (FIG. 6B) can include a variation of how to choose a first container while starting a pick-walk. In many embodiments, the variation can begin with choosing (picking) as many items as possible based on commonality with the biggest container. In some embodiments, each picker can walk a path (route) of a biggest container a single time to cover as many items on this path as part of a single pick-walk.

In various embodiments, biggest container first logic, can expressed as algorithm 6, as follows:

---

(6)

Input - List of Containers C = {$C_1, C_2, C_3 ... C_n$}.
1. Each Container $C_i$ contains items which belongs to a set of aisles stored in a sorted order, such that each aisle forms an aisle set aisle set A = [$A_p ...A_t ...A_z$] where ($A_t - A_p$) < ($A_z - A_p$).
2. Until Containers are exhausted, keep generating pick-walks.
3. For starting a new pick-walk, choose a container using the criteria below:
   I. Max(size(A)) – container having a minimum number of aisles.
   II. Max($A_z - A_p$) – container having a minimum relative distance between aisles.
4. Until a pick-walk with aisles $A_i$ is full (e.g., is under configured thresholds like max containers, max item quantity etc.)
   I. Execute a Find operation to choose a Container $C_j$ with aisles $A_j$ from remaining Containers using below rules
     • Aisle Commonality:
     • $A_j$ is subset of $A_i$
     • Max (Size (Intersection($A_i, A_j$)))
     • Aisle proximity: (Union($A_i, A_j$)–> Min($A_z - A_p$))
   II. Execute a Union operation to combine the set of aisles together optimally.
   III. Once the required threshold is reached, the pick-walk can be marked optimized and added to the result.

---

In some embodiments, generating the at least two pick-walks further can include identifying, using a prioritization logic, a sort order of the two or more pick-walks. In a number of embodiments, input for identifying the sort order can include a list of pick-walks and a series of parameters. In various embodiments, a picker can refer to an employee, an associate, a picking robot, an electronic retrieval device and/or another suitable device that can retrieve and transport items using one or more containers.

In a number of embodiments, prioritization logic can expressed as algorithm 7, as follows:

---

(7)

Input - List of Pick-walks = {$P_1, P_2, P_3 ... P_n$}, series of parameters to identify sort order
1. Create a comparator chain for the specified sort order.
2. Sort pick-walks according to the comparator created in previous step.
3. Return the first pick-walk in the list.

---

In various embodiments, generating the at least two pick-walks further can include creating a comparator chain for the sort order, as identified.

In several embodiments, generating the at least two pick-walks further can include sorting the two or more pick-walks based on an output of the comparator chain.

In many embodiments, generating the at least two pick-walks further additionally can include sequentially assigning each pick-walk of the sort order to the at least two pickers to retrieve the multiple items of the multiple orders and the one or more additional items of the one or more additional orders based on a time constraint within a predetermined time window.

In some embodiments, method 600 (FIG. 6B) also can include a block 670 of transmitting the at least two pick-walks to the at least two pickers. In various embodiments, an advantage of generating and transmitting the at least two pick-walks can be shown by the number of aisles visited based on a conventional method of creating pick-walks by randomly assigning pick-walks to pickers and the current method of generating pick-walks based on a series of algorithms (logic), as follows:

In example 1, each picker (e.g., associate) is assigned a pick-walk, wherein the pick-walk is configured to retrieve 2 items: Apples placed at an Aisle A1 and Water bottles placed at an Aisle A2.
Previous Pick-Walk Methodology:
   Pick-walk 1→sends picker 1 to both A1 and A2 to get some apples and some water bottles.
   Pick-walk 2→sends picker 2 to both A1 and A2 to get some apples and some water bottles.
   Total aisles visited=4 (2 in each pick walk)
New Solution:
   Pick-walk 1→sends picker 1 to only A1 to get all apples.
   Pick-walk 2→sends picker 2 to only A2 to get all bottles.
   Total aisles visited=2 (1 in each pick-walk by each picker)
In example 2, each picker (e.g., associate) is assigned a pick-walk, wherein the pick-walk is configured retrieve 5 items: Apples in Aisle A1, Water bottles in Aisle A2, bread in Aisle A3, tissue paper in Aisle A10 and cookies in Aisle A11
Previous Pick-Walk methodology:
   Pick-walk 1→send picker 1 to A1, A2, A3, A10.
   Pick-walk 2→send picker 2 to A1, A3, A10, A11.
   Total aisles visited=8

New Solution:
  Pick-walk 1→send picker 1 to A1, A2, A3.
  Pick-walk 2→send picker 2 to A10, A11.
  Total aisles visited=5

Figure 7:
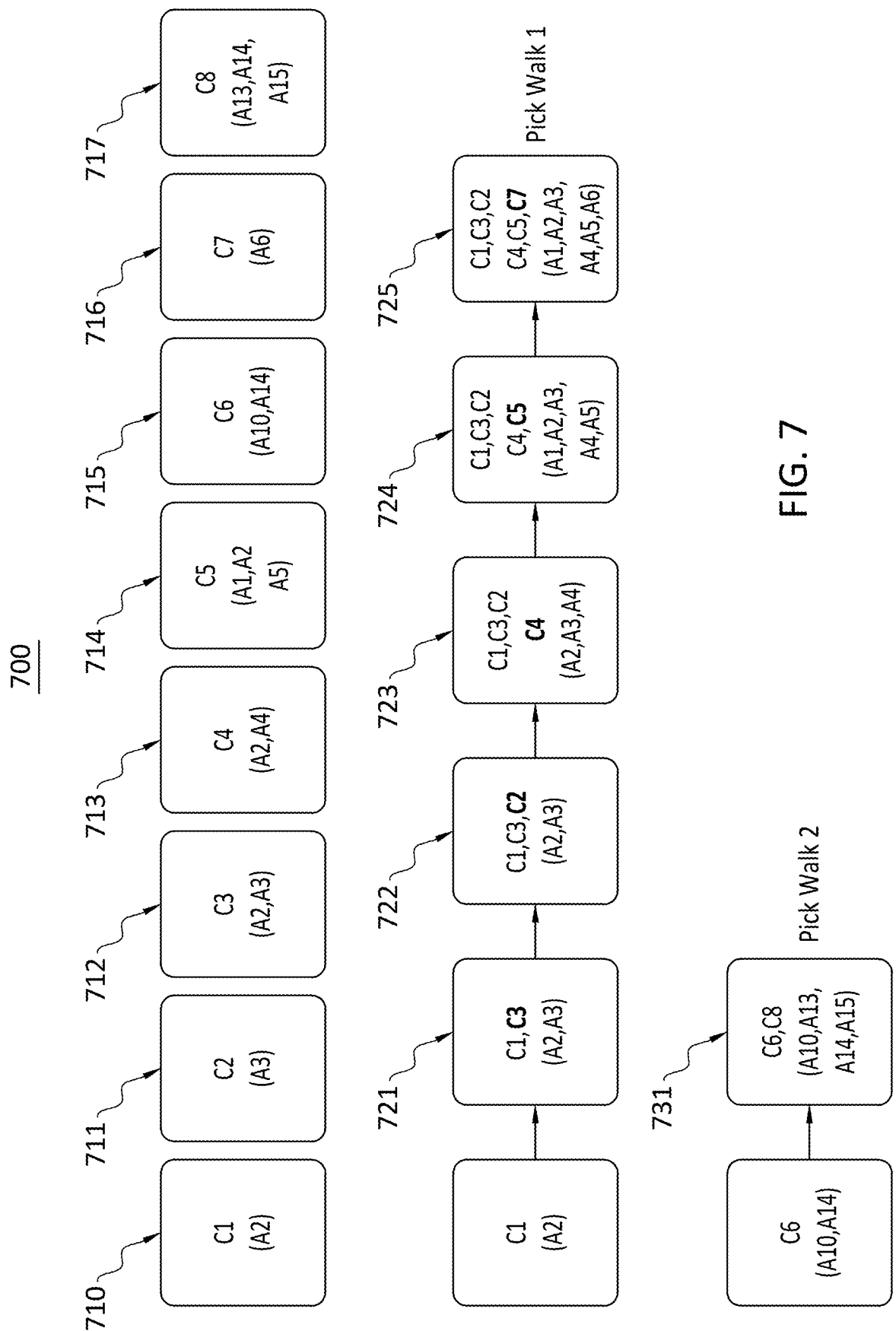
FIG. 7 illustrates a flow chart for a further method, according to an embodiment.

Referring to the drawings, FIG. 7 illustrates examples of generating a pick-walk based on each containers and respective aisle location, according to an embodiment. In some embodiments, a pick walk formation can depict an optimization technique for a list of containers, such as C-1 to C8, as further described below. In many embodiments, optimizing a list of containers can include a predetermined number of pick-walks for a picker, such as a maximum number of containers per a pick-walk assigned to a picker. Such a number can be approximately 2, 4, 6, 8, and/or another suitable maximum number of containers that makeup each pick-walk. In some embodiments, generating a pick-walk can begin with a list of containers (e.g., maximum number of containers in a pick-walk), such as C1, C2, C3, C4, C5, C6, C7, and C8, and a sequence of aisles in a location, such as A1, A2, A3, A4, A5, A6, A10, A11, A12, A13, A14, and A15. In many embodiments, each item in each container can be mapped to one or more aisles based on the type and/or category of items of each container to fulfill the orders.

In various embodiments, a container mapped to one or more aisles can form a subset of a list of containers that can include a single container and at least one aisle. In many embodiments, such exemplary subsets can be illustrated, as follows: a subset 710 (C1, A2), a subset 711 (C2, A3), a subset 712 (C3, A2, A3), a subset 713 (C4, A2, A4), a subset 714 (C5, A1, A2, A5), a subset 715 (C6, A10, A14), a subset 716 (C7, A6) and/or a subset 717 (C8, A13, A14, A15).

In a number of embodiments, a pick-walk can include analyzing a number of common aisles and a maximum proximity between two subsets. In various embodiments, at least two subsets can be merged into another subset until there are no containers with common aisles and maximum proximity remaining in the list of containers. In some embodiments, forming the final pick-walk can include each of the containers and each of the aisles of a final (end) subset.

In various embodiments, generating a pick-walk can utilize a graph computational method of union and find to generate pick-walks in sub millisecond latency that can provide optimal pick-walks in real time.

As an example of a graph computational method of a union and find method, an exemplary pick-walk 1 can begin by analyzing two subsets based on a number of common aisles and a maximum proximity between each respective subset. In this example, for pick-walk 1, based on the number of common aisles and maximum proximity between containers C1 and C3, subset 710 (C1, A2) and subset 712 (C3, A2, A3) can be merged forming a subset 721 (C1, C3, A2, A3). In this example, C3 includes more common aisles than Cl, therefore C3 has a maximum proximity over Cl. Similarly, in this example, subset 711 (C2, A3) is also mapped to A3, thus can be merged with subset 721 to form a subset 722. In this example, merging C2 formed an optimal subset as it included A3. Proceeding with this example, subset 713 (C4, A2, A4) includes the most common aisles and maximum proximity to subset 722, thus can be merged to subset 722 to form a subset 723. In this example merger, C4 includes the most common aisles, therefore has a maximum proximity over C1, C2, and C3. Similarly, subset 714 can be merged with subject 723 to form a subset 724. Lastly, although subset 716 has no common aisles with subject 724, subset 716 can be merged with subset 724 based on a maximum aisle proximity to form an end subset 725, where the end subset includes a cumulative number of containers and aisles for pick-walk 1. In this example, although there is no one container with common aisles, C7 has the max aisle proximity.

In another example, generating an exemplary pick-walk 2 can begin with analyzing subset 715 and subset 717 based on shared common aisles and a maximum proximity for form an end subset 731 (pick-walk 2).

Figure 8:
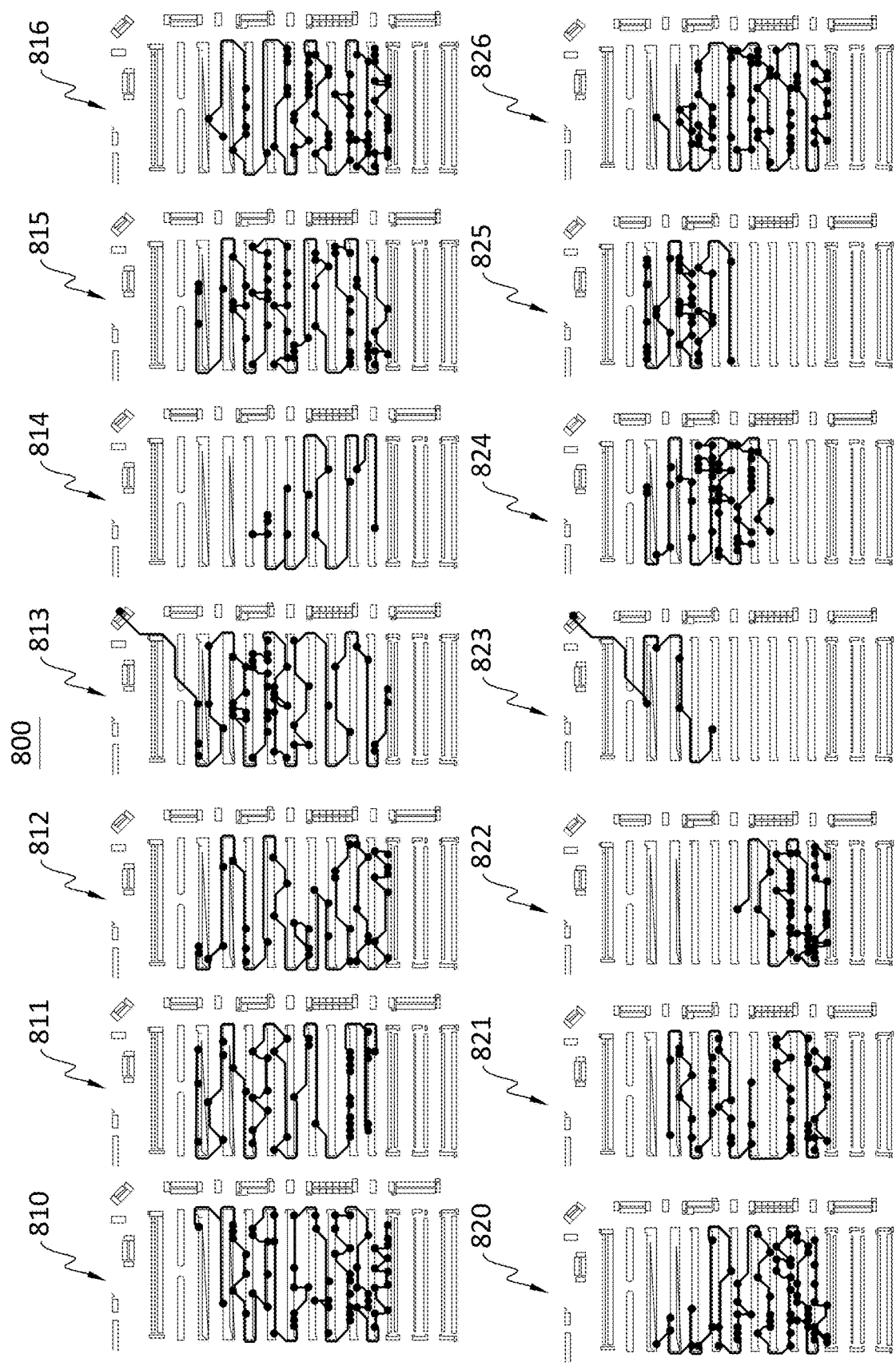
FIG. 8 illustrates diagrams of different pickwalks, according to an embodiment.

Referring to the drawings, FIG. 8 illustrates multiple exemplary routes based on multiple pick-walks, according to an embodiment. In some embodiments, routes can include a distance travelled for a pick-walk. For example, an exemplary store without implementing pick-walk system 310 (FIG. 3) for routes can include multiple pick-walks spanning 113 total aisles for a total distance travelled of approximately 6,206 feet. FIG. 8 also illustrates a improvement in the technology as shown by a marked difference in the distance travelled using different pick-walks to retrieve the same number of items and travelling less distance and in less time to fulfill the same number of orders. For example, in the same exemplary store implementing the pick-walk system, the total distance travelled can be approximately 4,508 feet instead of 6,206 feet for an improvement of over 27.3% efficiency spanning 80 total aisles versus 113 total aisles for an improvement of 29.2% efficiency.

In various embodiments, a first set of routes using a random method of generating a set of pick-walks can include exemplary routes 810, 811, 812, 813, 814, 815, and 816, as shown in the upper row of aisles in connection with FIG. 8. In several embodiments, a second set of routes can include exemplary routes 820, 821, 822, 823, 824, 825, and 826, as shown in the lower row of aisles in connection with FIG. 8. In this example, pickers using the first set of routes (conventional method) travelled approximately a total distance of 6,206 feet visiting approximately 113 aisles, wherein pickers using the second set of routes (new method) to retrieve the same number of items travelled approximately a total of 4,508 feet and approximately a total of 80 aisles. In this example, the second set of routes showed a 27 percent improvement in traveling distance and a 29 percent improvement in the number of aisles visited based on the same number of items packed in the same number of containers to fulfill the same number orders, except the second set of routes completed the task in less time.

Returning to FIGS. 6A and B, FIG. 6 illustrates a block diagram of pick-walk system 310. Pick-walk system 310 is merely exemplary and is not limited to the embodiments presented herein. Pick-walk system 310 can be employed in many different embodiments or examples not specifically depicted or described herein. In some embodiments, certain elements or systems of pick-walk system 310 can perform various procedures, processes, and/or acts. In other embodiments, the procedures, processes, and/or acts can be performed by other suitable elements or systems. In many embodiments, the systems of pick-walk system 310 can be modules of computing instructions (e.g., software modules) stored at non-transitory computer readable media. In other embodiments, the systems of pick-walk system 310 can be implemented in hardware.

In many embodiments, pick-walk system 310 can include communication system 311. In a number of embodiments, communication system 311 can at least partially perform block 410 (FIG. 4) of receiving multiple orders from users, block 460 (FIG. 4), of determining metadata enrichment for each pick-walk prior to selecting a particular pick-walk for a particular assignment to pickers, block 510 (FIG. 5) of receiving a request for a pick-walk from a picker, block 515

(FIG. 5) of fetching orders based on a time constraint of the order, block 605 (FIG. 6A) of receiving the multiple orders transmitted in one or more electronic formats, block 620 (FIG. 6A) of receiving requests for at least two pick-walks to fulfill multiple orders at a location, and/or block 670 (FIG. 6B) of transmitting the at least two pick-walks to the at least two pickers.

In several embodiments, pick-walk system 310 also can include mapping system 312. In various embodiments, mapping system 312 can at least partially perform block 625 (FIG. 6A) of mapping each of the multiple items to respective aisles within at least a single portion of the location.

In some embodiments, pick-walk system 310 further can include generating system 313. In several embodiments, generating system 313 can at least partially perform block 420 (FIG. 4) of determining a volumetric capacity of each container to store items of each order retrieved by one or more pickers, including using volumetric logic, block 430 (FIG. 4) of generating multiple pick-walks to fulfill multiple orders within a particular time window, block 470 (FIG. 4) of outputting multiple pick-walks, block 520 (FIG. 5) of generating multiple containers to assign to pickers that can hold items of a same commodity type (e.g., category), block 575 (FIG. 5) of populating a list of pick-walks by a prioritized sequence of orders based on a time window. block 635 (FIG. 6A) of generating, using volumetric logic, a volume of each container assigned to each of the two or more pick-walks based on a respective number of items from each of the multiple orders mapped to a set of aisles, block 650 (FIG. 6A) of generating, using time window bucketing logic, a bucket metric for a time window, and/or block 665 (FIG. 6B) of generating the at least two pick-walks based on the two or more pick-walks.

In various embodiments, pick-walk system 310 additionally can include prioritizing system 314. In many embodiments, prioritizing system 314 can at least partially perform block 450 (FIG. 4) of determining a prioritization order for each pick-walk based on a time constraint of an order, and/or block 615 (FIG. 6A) of prioritizing each order that exceeds the predetermined time window to be added to the at least two pick-walks based on the time constraint.

In several embodiments, pick-walk system 310 also can include selecting system 315. In some embodiments, selecting system 315 can at least partially perform block 440 (FIG. 4) of generating pick-walks to optimize a distance travelled by multiple pickers, block 535 (FIG. 5) of selecting a first container with items located on a least number of aisles from the set of aisles in a location, block 545 (FIG. 5) of determining whether or not a container is volumetrically maximized, block 550 (FIG. 5) of finding a container with (i) a least route position difference and (ii) a maximum number of common aisles, block 555 (FIG. 5) of of adding a container that is volumetrically maximized to a pick-walk, and/or block 660 (FIG. 6A) of selecting the bucket metric matching the respective time window.

In a number of embodiments, pick-walk system 310 additionally can include calculating system 316. In several embodiments, pick-walk system 310 can at least partially perform block 560 (FIG. 5) of determining whether or not each pick-walk meets a container threshold, block 565 (FIG. 5) of adding a pick-walk to a set of pick-walks, block 570 (FIG. 5) of determining whether a container of the set of containers are exhausted, block 630 (FIG. 6A) of calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks, and/or block 655 (FIG. 6A) of calculating a respective time window according to a time zone of the location.

In some embodiments, pick-walk system 310 further can include sorting system 317. Sorting system 317 can at least partially perform block 525 (FIG. 5) of generating bucket metrics for a time window for each container, block 530 (FIG. 5) of running multiple iterations of each container in a set of containers until each container volumetrically maximized, and/or block 640 (FIG. 6A) of sorting each item of the multiple items in the multiple orders mapped to a respective aisle of the set of aisles until the multiple items of the multiple orders are exhausted. In various embodiments, each iteration of the multiple iterations conducted for each container in the set of containers utilizes information learned from each previous iteration (or at least one previous iteration) until each container (or at least a minimum number or percentage of containers) is volumetrically maximized and/or the multiple items of the multiple orders are exhausted and the iterative process completes.

In some embodiments, pick-walk system 310 also can include identifying system 318. Identifying system 318 can at least partially perform block 540 (FIG. 5 of finding a container with items located on a subset of aisles from a number of aisles on the route generated by a pick-walk, and/or block 610 (FIG. 6A) of identifying whether each order of the multiple orders is associated with a time constraint within a predetermined time window.

In various embodiments, pick-walk system 310 also can include assigning system 319. Assigning system 319 can at least partially perform block 645 (FIG. 6A) of assigning a new container to exhaust the one or more items of the multiple orders.

In several embodiments, web server 320 can include a web page system 321. Web page system 321 can at least partially perform sending instructions to user computers (e.g., 350-351 (FIG. 3)) based on information received from communication system 311.

In many embodiments, the capacity to fulfill orders received electronically in real-time can be limited by the resources available at any given time. Generally, millions of orders are received daily where each order can include a pick-up time and/or a delivery time. Pickers rely on pick-walks to retrieve hundreds of thousands of items every day. In various embodiments, a technological improvement over the conventional method by using aisle commonality and aisle proximity to generate pick-walks in real time can be an advantage by minimizing a distance travelled to retrieve the items and decreasing time to fulfill the orders.

In several embodiments, an advantage of generating pick-walks using a series of algorithms can be less expensive than randomly creating pick-walks since there is no reliance on using store layouts, like X,Y coordinates, to calculate distances. Instead, in some embodiments, generating optimized pick-walks by using the knowledge of item placement on display shelves (racks) and relative positioning of these shelves on the aisles can be an improvement over the prior method of randomly assigning pick-walks.

In a number of embodiments, the techniques described herein can advantageously enable real-time data processing and increase the capability to fulfill orders while decreasing the distance travelled to pick the item for the orders.

In many embodiments, the techniques described herein can be used continuously at a scale that cannot be handled using manual techniques. For example, the number of streaming orders received daily can exceed over one million items (products) required to be processed in a timely manner.

Various embodiments can include a system including one or more processors and one or more non-transitory computer-readable media storing computing instructions that, when executed on the one or more processors, cause the one or more processors to perform certain acts. The acts can include receiving requests for at least two pick-walks to fulfill multiple orders at a location. Each of the multiple orders can include at least one respective item. Each of the multiple orders can include multiple items. The acts also can include mapping each of the multiple items to respective aisles within at least a single portion of the location. The acts additionally can include calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks. The two or more pick-walks can include being revised through multiple iterations based on receiving one or more additional items of one or more additional orders until each container assigned to each of the two or more pick-walks is volumetrically maximized with the multiple items of the multiple orders and the one or more additional items of the one or more additional orders. The acts further can include generating the at least two pick-walks based on the two or more pick-walks. Each of the at least two pick-walks can identify a respective route for each of at least two pickers to retrieve the multiple items of the multiple orders and the one or more additional items of the one or more additional orders. Each of the at least two pickers can include retrieve items of a single order of the multiple orders or of the one or more additional orders. The acts also can include transmitting the at least two pick-walks to the at least two pickers.

A number of embodiments can include a method being implemented via execution of computing instructions configured to run at one or more processors and stored at one or more non-transitory computer-readable media. The method can include receiving requests for at least two pick-walks to fulfill multiple orders at a location. Each of the multiple orders can include at least one respective item. Each of the multiple orders can include multiple items. The method also can include mapping each of the multiple items to respective aisles within at least a single portion of the location. The method additionally can include calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks, wherein the two or more pick-walks are revised through multiple iterations based on receiving one or more additional items of one or more additional orders until each container assigned to each of the two or more pick-walks is volumetrically maximized with the multiple items of the multiple orders and the one or more additional items of the one or more additional orders. The method further can include generating the at least two pick-walks based on the two or more pick-walks. Each of the at least two pick-walks can identify a respective route for each of at least two pickers to retrieve the multiple items of the multiple orders and the one or more additional items of the one or more additional orders. Each of the at least two pickers can retrieve items of a single order of the multiple orders or of the one or more additional orders. The method also can include transmitting the at least two pick-walks to the at least two pickers.

Although automatically generating pick-walks to fulfill orders has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 3-8 may include different procedures, processes, and/or activities and be performed by many different modules, in many different orders, and/or one or more of the procedures, processes, or activities of FIGS. 3-8 may include one or more of the procedures, processes, or activities of another different one of FIGS. 3-8. As another example, the systems within pick-walk system 310 and/or webserver 320. Additional details regarding pick-walk system 310 and/or webserver 320, (see FIGS. 3 and 6) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
   receiving requests for at least two pick-walks to fulfill multiple orders at a location, wherein each of the multiple orders comprise at least one respective item, wherein the multiple orders comprise multiple items;
   mapping each of the multiple items to respective aisles within at least a single portion of the location;
   calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks, wherein the two or more pick-walks are revised through multiple iterations based on receiving one or more additional items of one or more additional orders until each container assigned to each of the two or more pick-walks is volumetrically maximized with the multiple items of the multiple orders and the one or more additional items of the one or more additional orders;

generating the at least two pick-walks based on the two or more pick-walks, wherein each of the at least two pick-walks identify a respective route for each of at least two pickers to retrieve the multiple items of the multiple orders and the one or more additional items of the one or more additional orders, and wherein each of the at least two pickers retrieve items of a single order of the multiple orders or of the one or more additional orders; and transmitting the at least two pick-walks to the at least two pickers to cause the at least two pickers to perform the at least two pick-walks, wherein each of the at least two pickers comprise a respective picking robot.

2. The system of claim 1, wherein:

the operations further comprise:

receiving the multiple orders transmitted in one or more electronic formats, wherein the one or more electronic formats comprise text-based or image-based content;

identifying whether each order of the multiple orders is associated with a time constraint within a predetermined time window, wherein the time constraint comprises a pick-up time; and prioritizing each order of the multiple orders that exceeds the predetermined time window to be added to the at least two pick-walks based on the time constraint;

the multiple items of the multiple orders are located within the at least the single portion of the location, and the one or more additional items of the one or more additional orders are located within the at least the single portion of the location.

3. The system of claim 1, wherein using the core logic comprises:

receiving a list of containers, wherein each container of the list of containers comprises one or more items located on at least one aisle of a set of aisles in the location;

prior to generating a pick-walk of the at least two pick-walks, selecting each container of the list of containers based on at least (i) a minimum number of aisles to retrieve the one or more items in each container and (ii) a minimum relative distance between the minimum number of aisles;

selecting a container of the list of containers based on (i) the respective aisle commonality, and (ii) the respective aisle proximity; and generating the pick-walk for the at least one aisle of the set of aisles based on selecting the container.

4. The system of claim 3, wherein the respective aisle commonality comprises:

selecting a container mapped to a subset location of a particular aisle of the set of aisles;

calculating an intersection distance between the subset location and the particular aisle; and determining a relationship metric between the subset location and the particular aisle, wherein the intersection distance falls below a predetermined threshold.

5. The system of claim 4, wherein the respective aisle proximity comprises:

determining a proxmity distance between the set of aisles based on a physical layout of the location, wherein the proxmity distance comprises a union of the set of aisles that is less than or equal to a minimum proxmity distance between the set of aisles.

6. The system of claim 1, wherein calculating the minimum distance for each one of the two or more pick-walks to fulfill the multiple orders comprises:

determining the respective maximum number of containers for each pick-walk of the at least two pick-walks, wherein at least two containers of the respective maximum number of containers are revised in multiple iterations based on receiving the one or more additional items of the one or more additional orders until the at least two containers assigned to each of the two or more pick-walks are volumetrically maximized with the multiple items of the multiple orders and the one or more additional items of the one or more additional orders, and wherein each of the at least two containers volumetrically maximized meets a respective predetermined container volume threshold.

7. The system of claim 1, wherein the operations further comprise:

prior to generating the at least two pick-walks:

generating, using volumetric logic, a volume of each container assigned to each of the two or more pick-walks based on a respective number of items from each of the multiple orders mapped to a set of aisles, wherein each respective item dimension of the multiple items is aligned with each container dimension of each container assigned to each of the two or more pick-walks to find a maximum quantity of the multiple items to fit each container dimension;

sorting each item of the multiple items in the multiple orders mapped to a respective aisle of the set of aisles until the multiple items of the multiple orders are exhausted; and when there are one or more items of the multiple orders remaining after the sorting, assigning a new container to exhaust the one or more items of the multiple orders.

8. The system of claim 7, wherein:

for items of the multiple items ordered in quantities exceeding a size threshold for each container assigned to each of the two or more pick-walks:

determining, using an algorithm, a number of physical configurations in which each item of the items fits into each container dimension of each container assigned to each of the two or more pick-walks;

determining a maximum quantity of the items for each container assigned to each of the two or more pick-walks based on the number of physical configurations, wherein:

when a total volume of each item of the items exceeds a volume threshold of the container then decrease the maximum quantity of the items for each container assigned to each of the two or more pick-walks; and when the total volume of each item of the items is less than the volume threshold of the container then increase the maximum quantity of the items for each container assigned to each of the two or more pick-walks; and outputting a minimum container count for the items.

9. The system of claim 1, wherein the operations further comprise:

prior to generating the at least two pick-walks:
generating, using time window bucketing logic, a bucket metric for a time window, wherein input for generating the bucket metric comprises a timestamp for each container of the respective maximum number of containers, wherein each item of each container of the respective maximum number of containers is part of an order of the multiple orders, and wherein generating the bucket metric for the time window is based on one or more rules;
for each container of the respective maximum number of containers, calculating a respective time window according to a time zone of the location; and
selecting the bucket metric matching the respective time window.

10. The system of claim 1, wherein generating the at least two pick-walks further comprises:

identifying, using a prioritization logic, a sort order of the two or more pick-walks, wherein input for identifying the sort order comprises a list of pick-walks and a series of parameters;
creating a comparator chain for the sort order, as identified;
sorting the two or more pick-walks based on an output of the comparator chain; and
sequentially assigning each pick-walk of the sort order to the at least two picking robots to retrieve the multiple items of the multiple orders and the one or more additional items of the one or more additional orders based on a time constraint within a predetermined time window.

11. A method being implemented via execution of computing instructions configured to run on one or more processors and stored at one or more non-transitory computer-readable media, the method comprising:

receiving requests for at least two pick-walks to fulfill multiple orders at a location, wherein each of the multiple orders comprise at least one respective item, wherein the multiple orders comprise multiple items;
mapping each of the multiple items to respective aisles within at least a single portion of the location;
calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks, wherein the two or more pick-walks are revised through multiple iterations based on receiving one or more additional items of one or more additional orders until each container assigned to each of the two or more pick-walks is volumetrically maximized with the multiple items of the multiple orders and the one or more additional items of the one or more additional orders;
generating the at least two pick-walks based on the two or more pick-walks, wherein each of the at least two pick-walks identify a respective route for each of at least two pickers to retrieve the multiple items of the multiple orders and the one or more additional items of the one or more additional orders, [and] wherein each of the at least two pickers retrieve items of a single order of the multiple orders or of the one or more additional orders; and transmitting the at least two pick-walks to the at least two pickers to cause the at least two pickers to perform the at least two pick-walks, wherein each of the at least two pickers comprise a respective picking robot.

12. The method of claim 11, wherein:

the method further comprises:
receiving the multiple orders transmitted in one or more electronic formats, wherein the one or more electronic formats comprise text-based or image-based content;
identifying whether each order of the multiple orders is associated with a time constraint within a predetermined time window, wherein the time constraint comprises a pick-up time; and
prioritizing each order of the multiple orders that exceeds the predetermined time window to be added to the at least two pick-walks based on the time constraint;

the multiple items of the multiple orders are located within the at least the single portion of the location, and the one or more additional items of the one or more additional orders are located within the at least the single portion of the location.

13. The method of claim 11, wherein using the core logic comprises:

receiving a list of containers, wherein each container of the list of containers comprises one or more items located on at least one aisle of a set of aisles in the location;
prior to generating a pick-walk of the at least two pick-walks, selecting each container of the list of containers based on at least (i) a minimum number of aisles to retrieve the one or more items in each container and (ii) a minimum relative distance between the minimum number of aisles;
selecting a container of the list of containers based on (i) the respective aisle commonality, and (ii) the respective aisle proximity; and
generating the pick-walk for the at least one aisle of the set of aisles based on selecting the container.

14. The method of claim 13, wherein the respective aisle commonality comprises:

selecting a container mapped to a subset location of a particular aisle of the set of aisles;
calculating an intersection distance between the subset location and the particular aisle; and
determining a relationship metric between the subset location and the particular aisle, wherein the intersection distance falls below a predetermined threshold, and wherein the respective aisle proximity comprises:
determining a proxmity distance between the set of aisles based on a physical layout of the location, wherein the proxmity distance comprises a union of the set of aisles that is less than or equal to a minimum proxmity distance between the set of aisles.

15. The method of claim 11, wherein calculating the minimum distance for each one of the two or more pick-walks to fulfill the multiple orders comprises:

determining the respective maximum number of containers for each pick-walk of the at least two pick-walks, wherein at least two containers of the respective maximum number of containers are revised in multiple iterations based on receiving the one or more additional items of the one or more additional orders until the at least two containers assigned to each of the two or more pick-walks are volumetrically maximized with the multiple items of the multiple orders and the one or more additional items of the one or more additional orders, and wherein each of the at least two containers volumetrically maximized meets a respective predetermined container volume threshold.

16. The method of claim 11, further comprising:
prior to generating the at least two pick-walks:
generating, using volumetric logic, a volume of each container assigned to each of the two or more pick-walks based on a respective number of items from each of the multiple orders mapped to a set of aisles, wherein each respective item dimension of the multiple items is aligned with each container dimension of each container assigned to each of the two or more pick-walks to find a maximum quantity of the multiple items to fit each container dimension;
sorting each item of the multiple items in the multiple orders mapped to a respective aisle of the set of aisles until the multiple items of the multiple orders are exhausted; and
when there are one or more items of the multiple orders remaining after the sorting, assigning a new container to exhaust the one or more items of the multiple orders.

17. The method of claim 16, wherein:
for items of the multiple items ordered in quantities exceeding a size threshold for each container assigned to each of the two or more pick-walks:
determining, using an algorithm, a number of physical configurations in which each item of the items fits into each container dimension of each container assigned to each of the two or more pick-walks;
determining a maximum quantity of the items for each container assigned to each of the two or more pick-walks based on the number of physical configurations, wherein:
when a total volume of each item of the items exceeds a volume threshold of the container then decrease the maximum quantity of the items for each container assigned to each of the two or more pick-walks; and
when the total volume of each item of the items is less than the volume threshold of the container then increase the maximum quantity of the items for each container assigned to each of the two or more pick-walks; and
outputting a minimum container count for the items.

18. The method of claim 11, further comprising:
prior to generating the at least two pick-walks:
generating, using time window bucketing logic, a bucket metric for a time window, wherein input for generating the bucket metric comprises a timestamp for each container of the respective maximum number of containers, wherein each item of each container of the respective maximum number of containers is part of an order of the multiple orders, and wherein generating the bucket metric for the time window is based on one or more rules;
for each container of the respective maximum number of containers, calculating a respective time window according to a time zone of the location; and
selecting the bucket metric matching the respective time window.

19. The method of claim 11, wherein generating the at least two pick-walks further comprises:
identifying, using a prioritization logic, a sort order of the two or more pick-walks, wherein input for identifying the sort order comprises a list of pick-walks and a series of parameters;
creating a comparator chain for the sort order, as identified;
sorting the two or more pick-walks based on an output of the comparator chain; and
sequentially assigning each pick-walk of the sort order to the at least two picking robots to retrieve the multiple items of the multiple orders and the one or more additional items of the one or more additional orders based on a time constraint within a predetermined time window.

20. One or more non-transitory computer-readable media storing computing instructions that, when executed by one or more processors, cause the one or more processors to perform operations comprising:
one or more processors; and
one or more non-transitory computer-readable media storing computing instructions that, when executed on the one or more processors, cause the one or more processors to perform operations comprising:
receiving requests for at least two pick-walks to fulfill multiple orders at a location, wherein each of the multiple orders comprise at least one respective item, wherein the multiple orders comprise multiple items;
mapping each of the multiple items to respective aisles within at least a single portion of the location;
calculating, using core logic, a minimum distance for each one of two or more pick-walks to fulfill the multiple orders based on (i) a respective aisle commonality for each of the two or more pick-walks, (ii) a respective aisle proximity for each of the two or more pick-walks, (iii) a respective volume capacity of each container assigned to each of the two or more pick-walks, and (iv) a respective maximum number of containers assigned to each of the at least two pick-walks, wherein the two or more pick-walks are revised through multiple iterations based on receiving one or more additional items of one or more additional orders until each container assigned to each of the two or more pick-walks is volumetrically maximized with the multiple items of the multiple orders and the one or more additional items of the one or more additional orders;
generating the at least two pick-walks based on the two or more pick-walks, wherein each of the at least two pick-walks identify a respective route for each of at least two pickers to retrieve the multiple items of the multiple orders and the one or more additional items of the one or more additional orders, and wherein each of the at least two pickers retrieve items of a single order of the multiple orders or of the one or more additional orders; and
transmitting the at least two pick-walks to the at least two pickers to cause the at least two pickers to perform the at least two pick-walks, wherein each of the at least two pickers comprise a respective picking robot.

\* \* \* \* \*